United States Patent [19]

Bassi et al.

[11] Patent Number: 5,008,091
[45] Date of Patent: Apr. 16, 1991

[54] METHOD FOR PURIFYING AIR

[75] Inventors: Pawan K. Bassi, Benicia, Calif.; Kenneth C. Eastwell, Penticton, Canada; James S. Goudey, Calgary, Canada; Mary E. Spencer, Edmonton, Canada

[73] Assignee: Governors of the University of Alberta, Edmonton, Canada

[21] Appl. No.: 277,254

[22] Filed: Nov. 29, 1988

[51] Int. Cl.$^5$ .................. B01J 8/00; C07C 11/24; B01D 47/00
[52] U.S. Cl. .................. 423/245.1; 423/210; 422/173; 422/174; 422/177
[58] Field of Search .................. 423/245.1, 210; 422/173, 174, 177

[56] References Cited

U.S. PATENT DOCUMENTS

| | | | |
|---|---|---|---|
| 3,025,132 | 3/1962 | Innes | 422/177 |
| 3,167,400 | 1/1965 | Fisher | 422/173 |
| 4,138,220 | 2/1979 | Davies et al. | 422/177 |
| 4,331,693 | 5/1982 | Wojcirchowski et al. | 422/40 |
| 4,867,949 | 9/1989 | Betz | 422/177 |

FOREIGN PATENT DOCUMENTS

| | | | |
|---|---|---|---|
| 2401204 | 7/1975 | Fed. Rep. of Germany | 422/173 |
| 953216 | 3/1964 | United Kingdom | 423/245.1 |
| 2065629 | 7/1981 | United Kingdom | 423/245.1 |

Primary Examiner—Gregory A. Heller
Attorney, Agent, or Firm—Shoemaker and Mattare, Ltd.

[57] ABSTRACT

Low molecular weight hydrocarbons are removed from air by preheating the air and then passing the preheated air through a heated catalytic bed comprising a mixture of platinized heat-conductive pellets and metal turnings. The turnings contribute to the structural rigidity and the uniform heating of the bed, as well as reducing the energy consumption required to maintain the bed at the desired temperature.

9 Claims, 3 Drawing Sheets

FIG. 1

METHOD FOR PURIFYING AIR

The present invention relates to a method and apparatus for removing low molecular weight hydrocarbons, such as methane, ethylene and ethane, present as impurities in air supplies.

BACKGROUND OF THIS INVENTION

Contaminated air supplies are of concern in many economic sectors, such as commercial horticulture, as well as to scientists studying growth and metabolism of plants, animals, or microorganisms. Ethylene is produced by and has effects on all of them. Ethylene is widely recognized as a plant growth regulator and levels less than 50 ppb in air can alter plant metabolism. For instance, the role of ethylene in the ripening of climacteric fruits is well documented. The post-harvest storage life of flowers and climacteric-type fruits can be extended by removing ethylene, evolved by the produce and from other sources, from the storage atmosphere. Our invention provides a reliable, efficient, and safe method for obtaining hydrocarbon free air for other purposes as well.

A variety of oxidative and adsorptive approaches to removing hydrocarbons present as impurities in air supplies have been proposed. Adsorbent traps are often less effective, as they have finite binding capacities and they frequently require the handling and/or disposal of toxic materials. For most applications, oxidative methods are preferred, including reaction with ozone, atomic oxygen, potassium permanganate or metal catalysts. Ozone is a powerful oxidant but it is highly corrosive and toxic to man at low concentrations. Atomic oxygen is more reactive than ozone towards ethylene but this approach, like reaction with ozone, requires specialized equipment and trained personnel. Although permanganate is non-volatile, a large surface area is required to remove trace amounts of ethylene from air supplies. Unlike ozone and atomic oxygen, permanganate requires special and expensive procedures for handling and disposal. Permanganate is not not reusable. In addition, this method is non-selective, dangerous and, in many cases, does not effect complete removal of hydrocarbon gases.

Air flow through a heated metal catalyst (nickel, copper, zinc, cobalt, platinum) is an effective method of removing low molecular weight hydrocarbons. Hydrocarbons are oxidized to carbon dioxide and water in the presence of the catalyst. Metal catalysts are reusable and stable during extended use if provided with sufficient oxygen for regeneration and heated within specified operating temperatures. (High temperatures can damage certain metal catalysts and reduce their efficiency.) The amount of oxygen required for regeneration is stoichiometrically related to the levels of hydrocarbons removed (oxidized) from the air stream. For the trace amounts of hydrocarbons present in most air supplies (<10 ppm) the amount of oxygen consumed is negligible. Levels of carbon dioxide produced under these conditions are also minimal.

The efficiency of any catalyst is largely determined by the amount of active surface area and control over catalyst temperature. The active surface area can be increased by coating a suitable fibrous support material, such as asbestos, with the metal catalyst. On more rigid porous support materials (such as aluminum oxide pellets) a greater active surface area can be achieved by impregnating with metal solutions containing organic solutes (fatty acids for example) that lower the surface tension and/or by infiltrating under partial vacuum. The organic solutes are then removed (oxidized) at high temperature before the catalyst is used. Both methods increase the penetration of the soluble metal into the support material thereby developing a greater active surface area.

Non rigid catalyst support materials such as asbestos are disadvantageous for systems with high flow rates. High flow rates may compress these materials, which will impede air flow and reduce catalyst efficiency. Moreover, increasing the active surface area on more rigid support materials does not, in most cases, enhance catalyst efficiency at high flow rates.

The combustion of a low molecular weight hydrocarbon (e.g. ethylene) by catalytic combustion in the presence of platinum is already well known, and reference may be made to U.S. Pat. 4,331,693, issued May 25, 1982 to Wojciechowski. In this patent, aluminum oxide is impregnated with a solution of a fatty acid followed by chloroplatinic acid, then dried and heated.

GENERAL DESCRIPTION OF THIS INVENTION

In view of the problems inherent in conventional approaches to this problem, an object of one aspect of this invention is to provide a method and apparatus specially designed to effect the substantially complete oxidation of low molecular weight hydrocarbons at high flow rates. A major factor in achieving this aim is the efficient and uniform heating of the catalyst bed, accomplished by incorporating a good thermal conductor into the catalyst bed. More particularly, turnings made of stainless steel or other suitable metal or mixture of different metals are incorporated into the bed for this purpose. Aluminum oxide in pellet form, acting as a support for the platinum catalyst, also provides better heat conductivity than catalyst supports such as asbestos. Additionally, the contaminated influent air stream is also preheated before it comes in contact with the catalyst, thereby preventing uneven heating of the catalyst bed.

More particularly, this invention provides a method of removing low molecular weight hydrocarbons such as methane, ethane and ethylene from air, comprising the steps:

(a) preheating the air, and
(b) passing the preheated air through a heated catalytic bed comprising a mixture of platinized, heat-conductive pellets and metal turnings, the volume ratio of metal turnings to platinized pellets lying between about 1:2 and about 2:1.

GENERAL DESCRIPTION OF THE DRAWINGS

Three embodiments of this invention are illustrated in the accompanying drawings, in which like numerals denote like parts throughout the several views, and in which.

DETAILED DESCRIPTION OF THIS INVENTION

Figure 1:
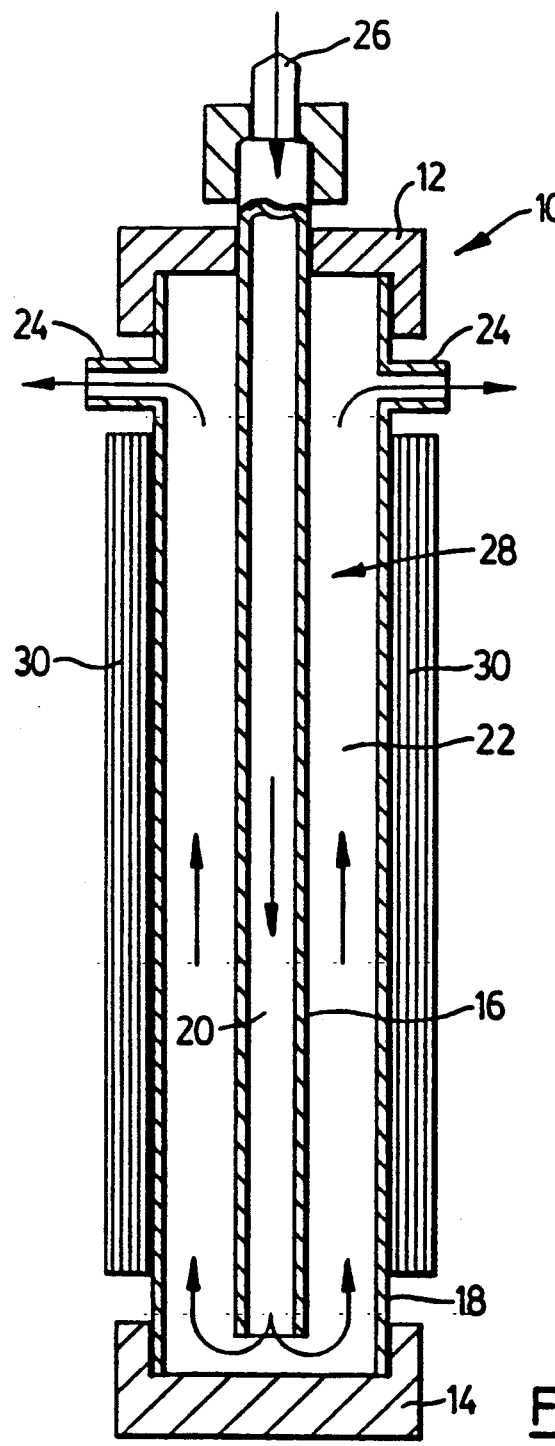
FIG. 1 is a vertical sectional view through an apparatus constructed in accordance with a first embodiment of this invention.

Attention is first directed to FIG. 1, which shows an apparatus 10 consisting of a top mounting member 12, a bottom mounting member 14, and two concentric stainless steel tubes. The tubes consist of an inner tube 16 and an outer tube 18. The arrangement of tubes 16 and 18 is such as to define a first chamber 20 within the tube 16, and a second chamber 22 in the annular space between the two tubes 16 and 18. The inner tube 16 is open at the bottom, which allows the two chambers 20 and 22 to be in communication at the bottom end of the apparatus 10. At the upper portion of the outer tube 18, there are provided outlet means 24 to allow air to be ducted out of the apparatus 10. The inner tube 16, has, at its upper end, an inlet opening 26 through which contaminated air can enter the apparatus. In the figure, the arrows show the flow of air.

In the first embodiment of this invention as illustrated in FIG. 1, a catalytic bed 28 is provided in the second chamber 22, i.e. in the annular space between the tubes 16 and 18. preferably the catalytic bed 28 comprises a mixture of platinized aluminum oxide pellets and stainless steel turnings, although other materials could be utilized. Typically, the aluminum oxide pellets are platinized by being impregnated with from about 1% to about 5% by weight of platinum chloride. This is accomplished by soaking the aluminum oxide pellets in a solution of chloroplatinic acid for several hours, pouring off the solution, then drying the pellets at 50° C. We have found cylindrical aluminum oxide pellets (5.0 mm long by 3.0 mm in diameter) to be very satisfactory, but of course other shapes and sizes can be used. The ratio of stainless steel turnings (coarse, medium or fine) to aluminum pellets, on a volume basis, can be varied from about 1:2 to about 2:1, without affecting the performance of the purification apparatus. A ratio of approximately 1:1 is preferred for the high flow rates that would be used in commercial applications. We have found that the stainless steel turnings provide more efficient and uniform heating of the catalyst, and afford greater rigidity to the catalyst bed, than is provided by the pellets alone held in place by their own weight. The catalyst bed must remain substantially stationary, particularly at high flow rates, in order to maintain the desired catalyst temperature and prevent damage to the pellets which otherwise may clog the outlets and impede air flow. The probability of movement within the catalyst bed becomes greater when the turnings content of the bed drops below about 33%, even though the device will continue to function. This is due to the fact that the turnings provide structural support and rigidity for the bed, as already mentioned.

Means are provided for preheating the contaminated air before it comes into contact with the catalytic bed 28. In the embodiment illustrated in FIG. 1, preheating is accomplished by conveying the impure influent air stream down the centre of the inner concentric tube 16 which is located in the centre of the catalytic bed 28. The desired temperature is obtained by placing heating elements 30, regulated at the desired temperature, on the external surface of the outer concentric tube 18. These heating elements 30 can be uniformly distributed around the periphery of the tube 18, and are of known construction.

For more efficient heating of the influent air stream at high flow rates, the hollow portions of the apparatus 10, particularly the first chamber (that within the inside tube 16) can be loosely packed with stainless steel turnings (coarse, medium or fine).

When the method is aimed at removing all low molecular-hydrocarbons, the catalytic bed 28 is preferably heated to a temperature between about 300° C. and 350° C. However, operating temperatures below 300° C. can be used to remove only the more reactive hydrocarbons such as ethylene. More particularly, it has been found that the temperature below which ethylene will not be removed in the device disclosed herein is about 160° C., as measured on the external surface of the device at the midpoint of the catalyst bed. It will thus be understood that the range of 300° C. to 350° C. given above is merely an optimal range which is high enough to ensure that all hydrocarbons are removed, yet not so high as to make the operation uneconomical (due to heat loss) or to present a safety hazard. Hydrocarbon removal does occur at temperatures above 350° C.

Figure 2:
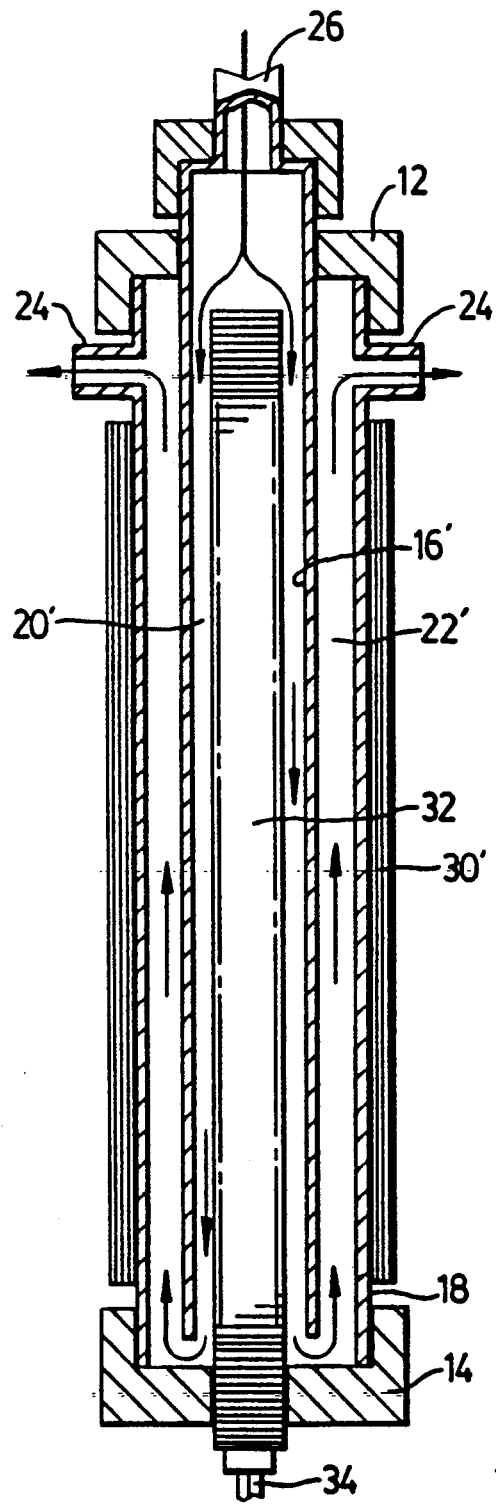
FIG. 2 is a vertical sectional view through an apparatus constructed in accordance with a second embodiment of this invention.

Attention is now directed to FIG. 2, which shows an embodiment similar to that illustrated in FIG. 1, with the exception that the inside tube 16' is of larger diameter, so that it can accommodate a tubular heater 32, having electrical supply wires 34. The embodiment shown in FIG. 2 can be operated with the tubular heater 32 supplying all of the heat, i.e. with no external heaters, or alternatively may utilize external heating elements 30' located on the outside surface of the outer tube 18. In FIG. 2, the external heating elements 30' are shown to be smaller than the equivalent heating elements 30 shown in FIG. 1. In FIG. 2 then, the preheated impure influent air travelling down the internal tube 16' reverses its direction at the bottom and flows up through the concentric outer tube 18 containing the catalytic bed 22', where low molecular weight hydrocarbon impurities are removed by being oxidized in the presence of the platinum catalyst. The purified air then exits through outlets 24 shown at the top of the outer tube 18.

Figure 3:
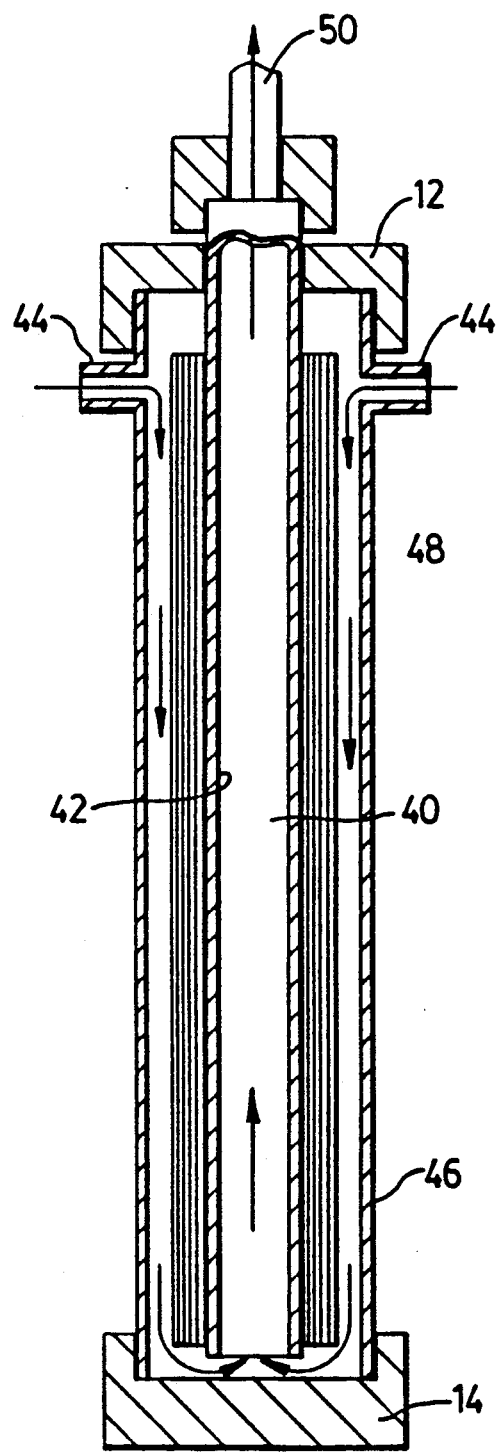
FIG. 3 is a vertical sectional view through an apparatus constructed in accordance with a third embodiment of this invention.

Attention is now directed to FIG. 3, which shows an arrangement in which the air flow is reversed from that of the first two embodiments. Specifically, a catalytic bed 40 is provided within the inner concentric tube 42, and impure air is directed inwardly through one or more inlets 44 located at the top of the outer concentric tube 46. Again, the first chamber located inside the inner tube 42 is in communication at the bottom with the second chamber located in the annular space between the two tubes. Thus, air arriving at the bottom of the second chamber passes radially inwardly, thence upwardly through the catalytic bed in the inner tube 42.

Heating of the apparatus is accomplished by heating elements 48 which are located on the external surface of the inner concentric tube 42 in the figure. Alternatively, the heaters may be located on the inner or outer surface of the outer concentric tube 46. Purified air exiting from the bed 40 is removed from the apparatus through the top end 50 of the inner tube 42.

Preferably, all versions of the entire device are enclosed in a high temperature heat insulation and encased in a stainless steel jacket (not illustrated). The temperature can be controlled with a rheostat by regulating the voltage applied to the heaters. A thermocouple placed between the external heater and the outer steel tube 5 cm from the bottom of the reactor vessel can be used to monitor temperature.

Although the illustrated embodiments have been shown and described with the axis of symmetry oriented vertically, it will be understood that these units could function in a horizontal position, or at any angle between the vertical and the horizontal.

TEST APPARATUS

The invention described herein was tested in the following manner. A device constructed in accordance with FIG. 1 was allowed to equilibrate for 3 hours following a final temperature and flow rate adjustment. Samples from the influent and effluent gas line were then removed for analysis in a Hewlett Packard Model 5880 gas chromatograph equipped with a stainless steel column (304×0.3 cm) packed with Porapak Q (80-100 mesh; Waters Associated Ltd.) and run isothermally at 50° C. The detection limit for each hydrocarbon was 0.05 ng.

During 10 months of continuous operation, levels of methane, ethane, and ethylene in the air supply ranged from 6.9-8.2, 0.100-0.200, and 0.010-0.020 ppm respectively. Methane is less reactive than both ethane and ethylene and requires a higher temperature for complete oxidation. Consequently the optimum operating temperature at each flow rate was defined as the temperature required to remove all traces of methane. Both ethane and ethylene were completely oxidized under these conditions. Ethylene is more reactive than other hydrocarbons and can be removed at lower temperatures.

At temperatures between 300° and 350° C. (measured with the thermocouple mentioned previously) this purification device removed all traces of methane, ethane, and ethylene in air at space velocities in excess of 10,000 catalyst bed volumes per hour. (Space velocity relates flow to catalyst volume and is a parameter kept constant when scaling a system.) At higher flow rates the air cooled the influent end of the reactor bed and this uneven heating decreased the efficiency of the catalyst to oxidize the less reactive methane. However all traces of ethane and ethylene were removed at space velocities of up to 15,000 catalyst bed volumes per hour when the temperature at the bottom of the outside tube was maintained between 300° and 350° C. Under these conditions, the temperature of the effluent air stream did not exceed 60° C.

The performance of the test apparatus was stable during extended use, when operated in accordance with the conditions defined. No loss of efficiency was detected after 10 months of continuous operation at temperatures between 300° and 350° C., and at a space velocity of 10,000 catalyst bed volumes per hour. Less than 0.25 kW h$^{-1}$ are required to operate the device under these conditions. When encased in the high temperature heat insulation, the apparatus is safe to handle during operation, and can be used in confined areas such as growth cabinets. This purification device has been used to remove hydrocarbon contaminants from air supplies for biochemical and physiological studies on isolated tissues, seeds, and intact plants. In addition, we have used the device to obtain hydrocarbon-free air for gas chromatography. Commercially available cylinders of compressed air contain hydrocarbon impurities at levels that can interfere with the analysis of gas samples, and here again the device of the present invention can find use. It can also be employed to remove hydrocarbons from air supplied to storage chambers containing horticultural products. Since ethylene is known to accelerate senescence and fruit ripening, ventilating storage chambers with hydrocarbon-free air would prolong the storage life of flowers and climacteric-type fruits. Also, the chamber air could be recirculated through the device to remove hydrocarbons. The device can be used to provide hydrocarbon-free air for other purposes as well.

GENERAL DISCUSSION

In order to remove hydrocarbon impurities at flow rates higher than 15000 catalyst bed volumes per hour, a greater platinum content (5% by weight) and/or pressurization of the reactor vessel is required. The reactor vessel can be pressurized by reducing the aperture of the outlet or outlets. However, higher flow rates can reduce the efficiency of heat exchange. Nonetheless, a cooling trap/coil wrapped around the effluent line or a heat exchanger in the effluent line could be used to cool down the purified gas stream to desired temperatures.

Due to the incorporation of a good thermal conductor (coarse, medium or fine metal turnings) into the reactor bed, and the preheating of the influent air stream, it is possible to obtain a more efficient and uniform heating of the catalyst, and a more efficient heat transfer to the influent impure air stream. Moreover, this makes the catalyst bed more rigid without impeding air flow. As result, the apparatus described herein can be operated at lower temperatures and at substantially higher flow rates (space velocity of 10,000 catalyst bed volumes per hour at 300° to 350° C.) than normal for devices of this type. These low temperatures will not produce biologically active levels of nitrous oxides or ozone, which are of great concern in biological studies. The provision of aluminum oxide pellets also offers less resistance to air flow and better heat conductivity than would be the case with some other catalyst support materials (like asbestos). A final advantage of the preferred embodiment of this invention is that the device is constructed out of incombustible and non-toxic materials.

While several embodiments of this invention have been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. A method of removing low molecular weight hydrocarbons selected from the group consisting of methane, ethane and ethylene from air, comprising the steps:
    (a) preheating the air;
    (b) passing the preheated air through a heated catalytic bed comprising a mixture of platinized, heat-conductive pellets and metal turnings, the volume ratio of metal turnings to platinized pellets lying between about 1:2 and about 2:1; and
    (c) the bed being contained in an annular space defined between two substantially vertically oriented and substantially concentric tubes made of heat-conductive material, having heating means applied against the exterior of the outermost tube, in which step (a) is performed by passing the air downwardly through the innermost of the two tubes to the bottom thereof, and in which step (b) is performed by passing the air upwardly through the bed between the tubes.

2. The method claimed in claim 1, in which the metal turnings are stainless steel and the pellets are aluminum oxide pellets impregnated with platinum chloride, letter being present at from 1% to 5% by weight.

3. The method claimed in claimed 1, in which the bed is heated to a temperature above about 300° C.

4. The method claimed in claim 1, wherein the method is for removing ethylene only, and wherein the bed is heated to a temperature between 160° C. and 300° C.

5. The method claimed in claim 1, in which performance of step (a) includes heating the air with a heater located within the innermost of the two tubes.

6. A method of removing low molecular weight hydrocarbons selected from the group consisting of methane, ethane and ethylene from air, comprising the steps:
 (a) preheating the air;
 (b) passing the preheated air through a heated catalytic bed comprising a mixture of platinized, heat-conductive pellets and metal turnings, the volume ratio of metal turnings to platinized pellets lying between about 1:2 and about 2:1; and
 (c) the bed being contained within the innermost of two substantially vertically oriented and substantially concentric tubes made of heat-conductive material, having heating means applied against the exterior of the innermost tube within the outermost tube, in which step (a) is performed by passing the air downwardly through the annular space defined between the two tubes, and in which step (b) is performed by passing the air upwardly through the bed within the innermost of the two tubes.

7. The method claimed in claim 6, in which the metal turnings are stainless steel and the pellets are aluminum oxide pellets impregnated with platinum chloride, the latter being present at from 1% to 5% by weight.

8. The method claimed in claim 6, in which the bed is heated to a temperature above about 300° C.

9. The method claimed in claim 6 wherein the method is for removing ethylene only and wherein the bed is heated to a temperature between 160° C. and 300° C.

* * * * *